United States Patent
Stadelmann et al.

(10) Patent No.: US 7,704,353 B2
(45) Date of Patent: Apr. 27, 2010

(54) ELECTRODE ASSEMBLY FOR THE ELECTROCHEMICAL TREATMENT OF LIQUIDS WITH A LOW CONDUCTIVITY

(75) Inventors: Manuela Stadelmann, Berlin (DE); Manfred Blaschke, Berlin (DE); Maja Wuensche, Berlin (DE); Helmut Petzer, Schildow (DE); Alexander Kraft, Berlin (DE); Thorsten Matthee, Hohenaspe (DE); Matthias Fryda, Itzehoe (DE)

(73) Assignee: Condias GmbH, Itzehoe (DE)

( * ) Notice: Subject to any disclaimer, the term of this patent is extended or adjusted under 35 U.S.C. 154(b) by 627 days.

(21) Appl. No.: 10/599,267

(22) PCT Filed: Mar. 24, 2005

(86) PCT No.: PCT/DE2005/000556

§ 371 (c)(1),
(2), (4) Date: Nov. 24, 2006

(87) PCT Pub. No.: WO2005/095282

PCT Pub. Date: Oct. 13, 2005

(65) Prior Publication Data

US 2007/0095655 A1 May 3, 2007

(30) Foreign Application Priority Data

Mar. 26, 2004 (DE) .................. 10 2004 015 680

(51) Int. Cl.
*C25B 9/08* (2006.01)
(52) U.S. Cl. .................. 204/263; 204/252; 204/253; 204/254; 204/255; 204/257

(58) Field of Classification Search .................. 204/252, 204/253, 254, 255, 257, 263
See application file for complete search history.

(56) References Cited

U.S. PATENT DOCUMENTS 4,244,802 A * 1/1981 Pohto et al. .................. 204/252
5,527,436 A * 6/1996 Cooker et al. ............... 205/428

(Continued)

FOREIGN PATENT DOCUMENTS

DE      42 27 73 2 C2     2/1994

(Continued)

OTHER PUBLICATIONS

Millet P. et al. Design and Performance of a Solid Polymer Electrolyte Water Electrolyzer, International Journal of Hydrogen Energy, elsevier science publishers B.V., Barking, GB, vol. 21, No. 2 Feb. 1996, pp. 87-93, XP004041042 ISSN: 0360-3199.

*Primary Examiner*—Bruce F Bell
(74) *Attorney, Agent, or Firm*—Whitham Curtis Christofferson & Cook, PC (57) ABSTRACT

The invention relates to an electrode assembly for the electrochemical treatment of liquids with a low conductivity. Said assembly comprises electrodes (1, 2), between which a polymer solid electrolyte (3) is situated. The electrodes are pressed against one another by means of a compression device (9, 10; 91) and are configured in such a way that the assembly can be traversed by the liquid. To produce said assembly simply and to ensure that it is flexible and easy to use, the compression device (9, 10; 91) is supported on the electrodes (1, 2).

33 Claims, 6 Drawing Sheets

U.S. PATENT DOCUMENTS

| | | | |
|---|---|---|---|
| 5,779,865 A | 7/1998 | Schulze et al. | 204/252 |
| 5,795,450 A * | 8/1998 | Hirai et al. | 204/256 |
| 5,876,575 A * | 3/1999 | Kump | 204/248 |
| 5,916,505 A * | 6/1999 | Cisar et al. | 264/85 |
| 6,387,241 B1 * | 5/2002 | Murphy et al. | 205/626 |
| 2005/0058886 A1 * | 3/2005 | Andrews et al. | 429/68 |

FOREIGN PATENT DOCUMENTS

| | | |
|---|---|---|
| DE | 295 04 323 U1 | 5/1996 |
| DE | 203 18 754 U1 | 3/2004 |
| DE | 10025167 | 6/2006 |
| EP | 1 038 993 A1 | 9/2000 |
| WO | WO 02/48431 A2 | 12/2001 |

* cited by examiner

ELECTRODE ASSEMBLY FOR THE ELECTROCHEMICAL TREATMENT OF LIQUIDS WITH A LOW CONDUCTIVITY

Electrode assembly for the electrochemical treatment of liquids with a low conductivity

FIELD OF THE INVENTION

The invention relates to an electrode assembly for the electrochemical treatment of liquids with a low conductivity, said assembly having electrodes which have a polymeric solid electrolyte arranged between them, are pressed against one another by means of a pressure-exerting device and are formed in such a manner that the liquid can flow through the assembly.

BACKGROUND

A main area of use for such an electrode assembly is in water systems in which pure water or ultrapure water is to be sterilized and rendered free of algae, in particular. In this case, the water system may comprise pipelines, collection tanks, open baths etc.

Electrode assemblies of the type mentioned initially are used, in particular, to disinfect rainwater, to disinfect ultrapure water circuits in the semiconductor industry and pharmaceuticals industry, to remove organic pollutants in rinse water, to purify water for the food industry and cosmetics industry, and in all types of industrial cooling-water circuits in order to prevent the growth of algae or the growth of bacteria or, in the case of high levels of contamination, to reduce the latter.

Such an electrode assembly can be used to generate oxidizing agents which oxidize germs and thus destroy or inactivate them.

The electrochemical generation of oxidizing agents has the advantage that it is possible, in principle, to adapt to the respective application. A large amount of oxidizing agent is thus required when a water system has already been contaminated with algae or biologically affected and is intended to be purified and disinfected. In contrast, once this operation has been concluded, the water system can be permanently kept in the disinfected and purified state, for which only a small amount of oxidizing agent is required from time to time.

A varying amount of oxidizing agent is also required when a water system has a high organic load as a result of an accident. A similar situation applies to the operation of filling a tank, in which a high level of oxidizing agent production is initially required in order to effect initial disinfection, while only relatively small amounts of oxidizing agent are then sufficient to maintain the disinfected state.

In principle, electrochemical methods are suitable for satisfying the different demands imposed on the production of oxidizing agents since the production of oxidizing agents can be controlled by supplying current.

In order to treat liquids with a low conductivity, for example ultrapure water, it is necessary, on account of the high resistance of the water, to use high voltages in order to generate the current densities required for the production of the oxidizing agents. This problem is partly solved by using polymeric solid electrolytes which, preferably in the form of a membrane having a thickness of a few tenths of a millimeter to a few millimeters, bridge the gap between the electrodes on the basis of their ion conductivity and are suitable as an interlayer between the electrodes in order to avoid a short circuit. On account of the relatively good ion conductivity of the polymeric solid electrolyte, the electrical potential of one electrode is brought very close to the other electrode, a film of water which is thus exposed to high current densities being situated between the surface of the polymeric solid electrolyte and the directly adjacent electrode.

Such electrode assemblies have been implemented for decades in the same manner in principle using the design of a "Fischer cell". In this case, a pressure-exerting device which is formed from a surrounding housing is used to press the flat electrodes flat against the membrane which is situated between the electrodes and comprises a polymeric solid electrolyte. A sufficient contact pressure is produced by screwing flat pressure plates of the housing, which must take place with a minimum torque.

On account of the high level of required stability of the pressure plates of the housing, the construction of such a cell is high and necessitates involved handling. In addition, adaptation to higher throughputs is problematic since the effective electrode area of the cell would have to be enlarged for this purpose or the flow of liquid would have to be divided up and passed through a plurality of cells.

The Fischer cells were originally constructed using lead oxide electrodes. In this case, the use of a lead oxide anode has the further disadvantage that the electrode decomposes in water if it is not held at a protective potential. The use of an electrode assembly having a lead oxide anode is therefore possible only during continuous operation, with the result that the option of using the corresponding cell only when required does not apply.

DE 100 25 167 A1, for example, discloses the practice of using an electrode through which a liquid can flow on account of numerous groove-shaped channels and which has a surface comprising a doped diamond layer. Such electrodes have likewise been arranged in a cell constructed like a Fischer cell (cf. DE 295 04 323 U1). The associated handling disadvantages have been accepted for decades by those skilled in the art as being unalterable.

SUMMARY

The present invention is based on the object of designing an electrode assembly of the type mentioned initially in such a manner that it enables an effective design of a corresponding electrolysis cell and nevertheless is simple to construct and handle.

In order to achieve this object, an electrode assembly of the type mentioned initially is characterized, according to the invention, in that the pressure-exerting device is supported on the electrodes.

The electrode assembly according to the invention thus does not require a special housing arrangement with complicated pressure plates to press the electrodes against the polymeric solid electrolyte used between the electrodes but rather merely requires a pressure-exerting device which is directly connected to the electrodes and obtains the contact-pressure force from the rather relatively low mechanical stability of the electrodes. The invention is based on the knowledge that an effective electrode assembly—in contrast to the idea of those skilled in the art which has existed for decades—can be implemented even without a very high force pressing the electrodes against the polymeric solid electrolyte. For suitable electrodes, it is sufficient if only a certain relatively low contact-pressure force of the electrodes is exerted on the polymeric solid electrolyte, so that the corresponding contact-pressure force does not have to be generated in a complicated manner using specially constructed housing parts but rather can be directly exerted on the electrodes themselves in a simple manner.

It is thus possible, for example, to use an expanded metal grid which is coated, for example, with a doped diamond layer as the support material for an electrode. A plastic screw can be inserted through the grid openings in the expanded metal grid until the head of the plastic screw rests against the electrode. The two electrodes can then be clamped in the direction of the polymeric solid electrolyte by screwing a nut onto the screw bolt which projects through the two electrodes and the solid electrolyte lying in between.

In this case, an intensive flow through the electrode assembly can be ensured by the polymeric solid electrolyte, which is preferably in the form of a membrane, also having through-flow openings. It is also possible to ensure the flow through the interspace between the electrodes by virtue of the polymeric solid electrolyte being arranged in strips, which are at a distance from one another, in the interspace between the electrodes. In one development of this idea, the polymeric solid electrolyte may also be arranged in area pieces, which are at a distance from one another on all sides, in the interspace, so that the ability to flow through the interspace in different directions is ensured.

The polymeric solid electrolyte may be inserted between the electrodes in the form of a membrane. However, when designed, in particular, in the form of area pieces which are at a distance from one another on all sides, it will be expedient if the polymeric solid electrolyte is applied to one of the electrodes as a surface layer.

Since the electrode assembly according to the invention does not require any complicated generation of contact pressure, it is readily possible to use the electrode assembly to construct a stack which enables an effective electrolysis device even for relatively high flow rates. Since the pressure-exerting device is supported on the electrodes themselves, it is readily possible to arrange numerous electrodes, with a polymeric solid electrolyte arranged between them, to form a stack. In this case, it is particularly expedient if the electrodes are provided with the aid of contact lugs, which project over their joint area, for the purpose of electrical contact-connection. In this case, the contact lugs of the anodes in the stack, on the one hand, and of the cathodes in the stack, on the other hand, may be formed such that they are aligned with one another in order to simplify joint contact-connection, for example by means of a contact rod which is inserted through openings in the contact lugs.

The electrode assembly according to the invention also allows departure from the hitherto customary flat electrodes in a surprisingly simple manner. It is thus possible, for example, to design two electrodes in the form of rods and to realize the polymeric solid electrolyte between the electrodes by virtue of the solid electrolyte in the form of a strip alternately wrapping around the electrodes under prestress. In this case, the strip may be fitted in such a manner that it respectively wraps around the two electrodes in the shape of a figure of eight, the wrapping-around process taking place with a certain amount of prestress in order to ensure intimate contact. The two electrodes may be pressed against the strip sections of the polymeric solid electrolyte between the electrodes using, for example, a material which is in the form of a wire, is wrapped around the electrodes and has ends which are twisted together in order to generate the pressure. In this case, the material which is in the form of a wire may preferably be an insulating material or may rest against the electrodes via an insulating layer.

DESCRIPTION OF THE DRAWINGS

The invention shall be explained in more detail below with reference to exemplary embodiments which are illustrated in the drawing, in which:

FIG. 12 shows a diagrammatic illustration of a treatment cell which has been charged with an electrode stack.

DETAILED DESCRIPTION

Figure 1:
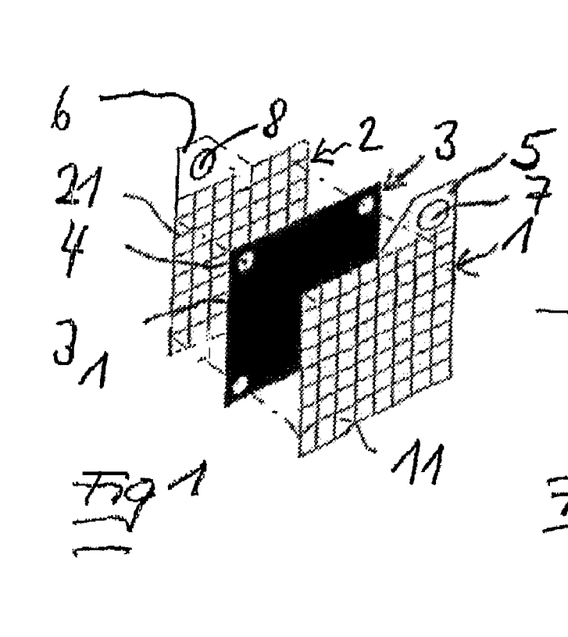
FIG. 1 shows a diagrammatic illustration of two electrodes and a membrane which is arranged between the latter and comprises a solid electrolyte.

FIG. 1 shows two electrodes 1, 2 in the form of expanded metal grids 11, 21. A first electrode 1 is used as a cathode, while the second electrode 2 acts as an anode. The two electrodes 1, 2 are flat, have a rectangular cross section and have the same area shape. A polymeric solid electrolyte 3 in the form of a membrane 31 whose area corresponds to the area of the electrodes 1, 2 is situated between the two electrodes 1, 2. The membrane 31 is provided with a respective passage opening 4 in its four corner regions. The membrane has a thickness of between 0.4 and 0.8 mm, for example.

Outside the rectangular area of the expanded metal grids 11, 21, the electrodes 1, 2 are each provided with a contact lug 5, 6 which projects out of the area. Both contact lugs have a passage opening 7, 8.

Figures 2, 3:
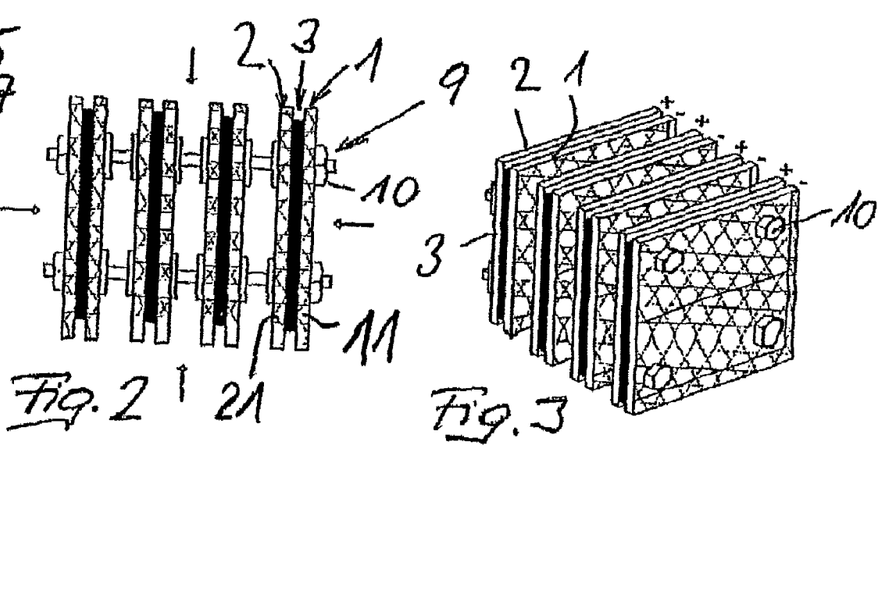
FIG. 2 shows a stack which is formed using the assembly according to FIG. 1.
FIG. 3 shows a perspective illustration of the stack according to FIG. 2.
Figure 2:
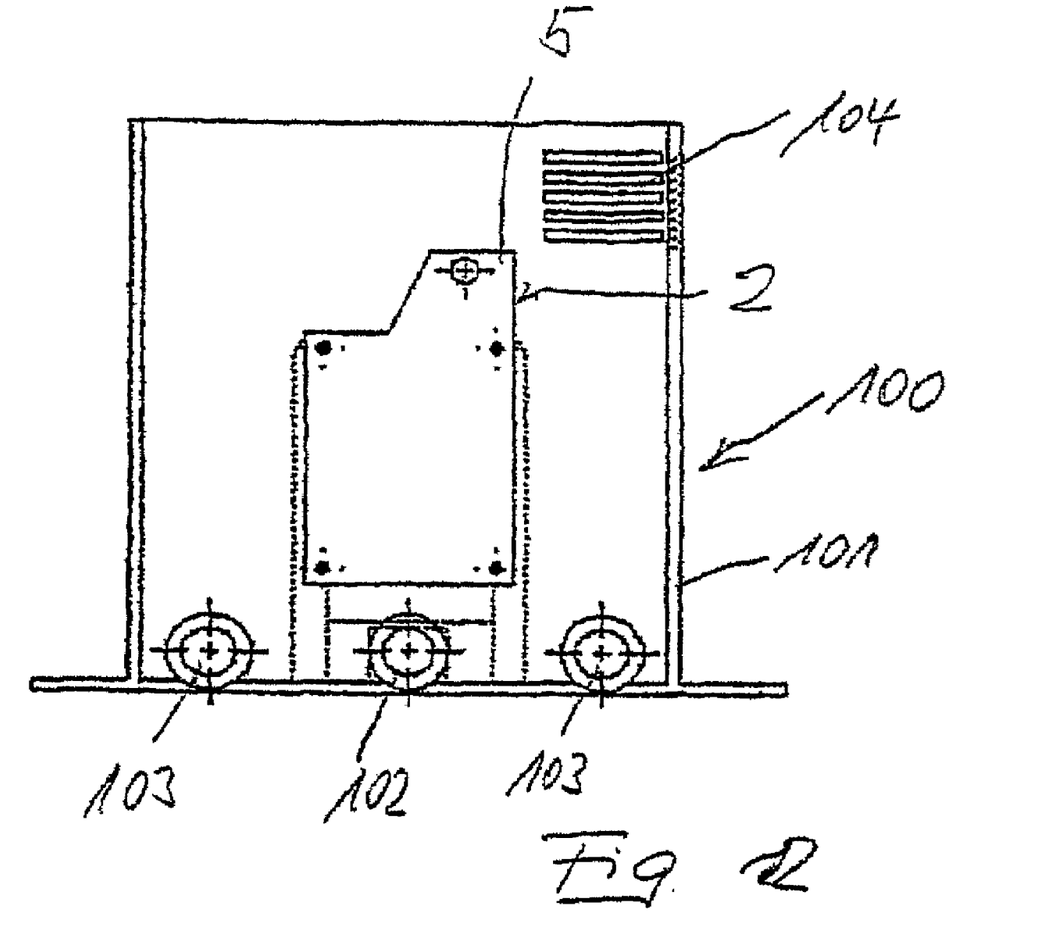

FIG. 2 illustrates that the electrodes 1, 2 which are formed from the expanded metal grids 11, 21 and have a respective solid electrolyte 3 between them are pressed against one another using a clamping device 9, the clamping device 9 extending over four electrode assemblies 1, 2, 3 which have been joined to form a stack. Clamping is effected using nuts 10 which can be clamped, against the electrodes 1, 2, on the threaded bolt 9.

According to FIG. 1, provision is made of four threaded bolts 9 which are inserted through interspaces in the expanded metal grids 11, 21 and through the passage openings 4 in the polymeric solid electrolyte 3.

FIG. 3 illustrates, in a perspective illustration, that the electrodes 1, 2 are each connected to different poles of the supply voltages. In the exemplary embodiment illustrated in FIGS. 1 to 3, the electrodes 1, 2 are formed with a support in the form of an expanded metal grid 11, 21 and are coated with a doped diamond layer. It is also possible to apply supply voltages of different magnitudes to the electrodes 1, 2.

Figure 4:
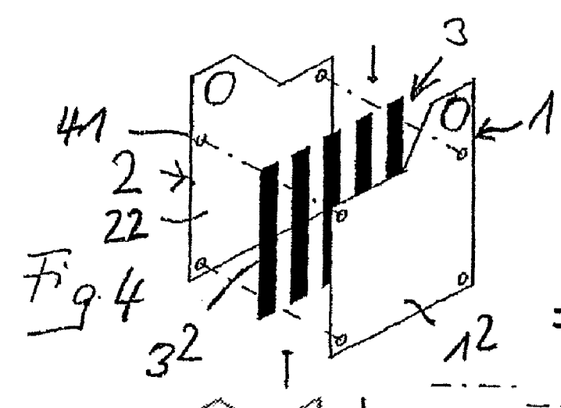
FIG. 4 shows another embodiment of two electrodes with a solid electrolyte in the form of strips which are arranged parallel to one another.

FIG. 4 shows a modified exemplary embodiment in which the electrodes 1, 2 are formed with metal plates 12, 22 that are coated with a doped diamond layer. The electrodes have passage openings 41 in their corner regions, through which threaded bolts 9 can be inserted in the manner described with reference to FIGS. 2 and 3.

Figure 5:
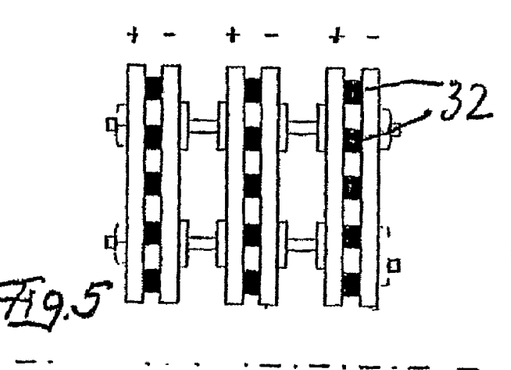
FIG. 5 shows a plan view of a stack which is formed using the assembly according to figure and in which each electrode is contact-connected.

In this exemplary embodiment, the polymeric electrolyte 3 is formed from vertical strips 32 which are arranged parallel to, and at a distance from, one another. The plan view in FIG. 5 illustrates that a flow can pass through the electrode assemblies in the formed stack perpendicular to the plane of the drawing on account of the strips 32.

Figure 6:
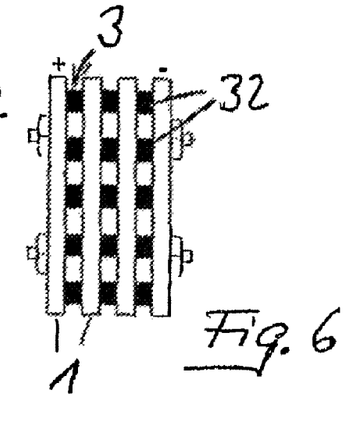
FIG. 6 shows a stack which is formed using the assembly according to FIG. 4 with only the outer electrodes being contact-connected.

The stack assembly illustrated in FIG. 6 comprises four identical electrodes 1 which are separated from one another by a respective solid electrolyte 3 in the form of the strips 32 here. In this case, contact-connection is effected with different polarities only at the two outer electrodes 1, as a result of which the middle electrodes assume correspondingly stepped potentials. Such an assembly in which the middle electrodes act both as an anode (to one side) and as a cathode is also referred to as a bipolar assembly.

Figure 7:
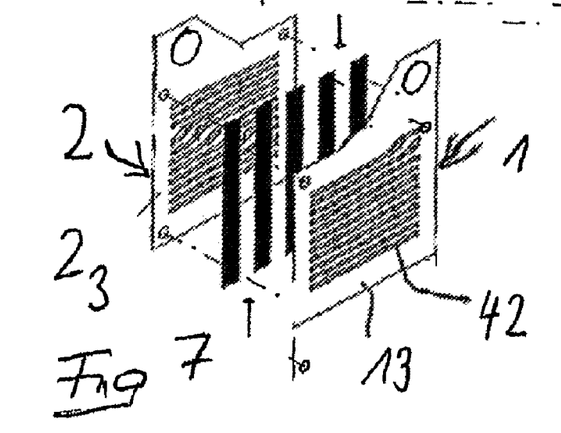
FIG. 7 shows a variant of the assembly according to FIG. 4, in which the electrode plates are provided with through-openings in the form of slots.
Figure 8:
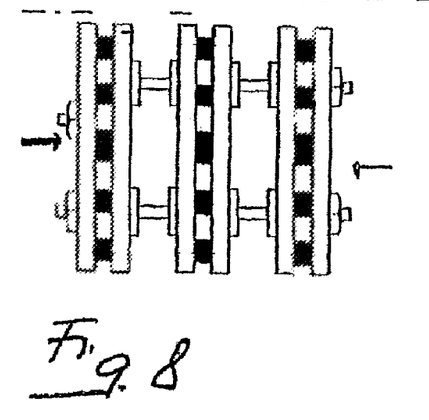
FIG. 8 shows a stack which is formed using the assembly according to FIG. 7.

The exemplary embodiment illustrated in FIG. 7 differs from the exemplary embodiment according to FIG. 4 only by virtue of the fact that with metal plates 13, 23 are used as the supports for the electrodes 1, 2, said metal plates being provided with horizontal passage openings 42 which are in the form of slots and make it possible for a flow to pass through the electrodes 1, 2. Accordingly, the arrows in FIG. 8 show that, in addition to the vertical flow (perpendicular to the plane of the drawing), a flow can pass through the electrode assemblies in the stacking direction.

Figure 9:
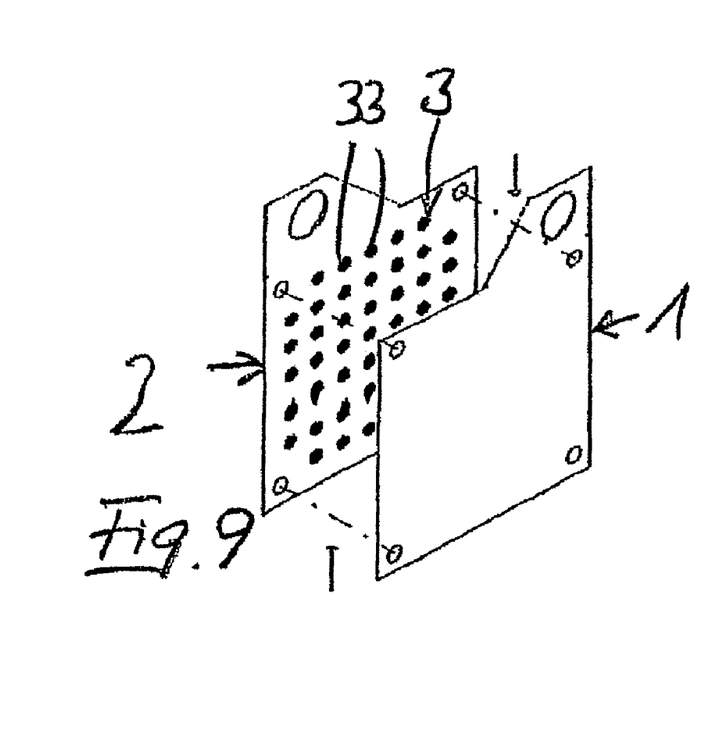
FIG. 9 shows an assembly comprising two electrodes, one of which is coated with applied area sections of the polymeric solid electrolyte on its surface which faces the other electrode.
Figure 10:
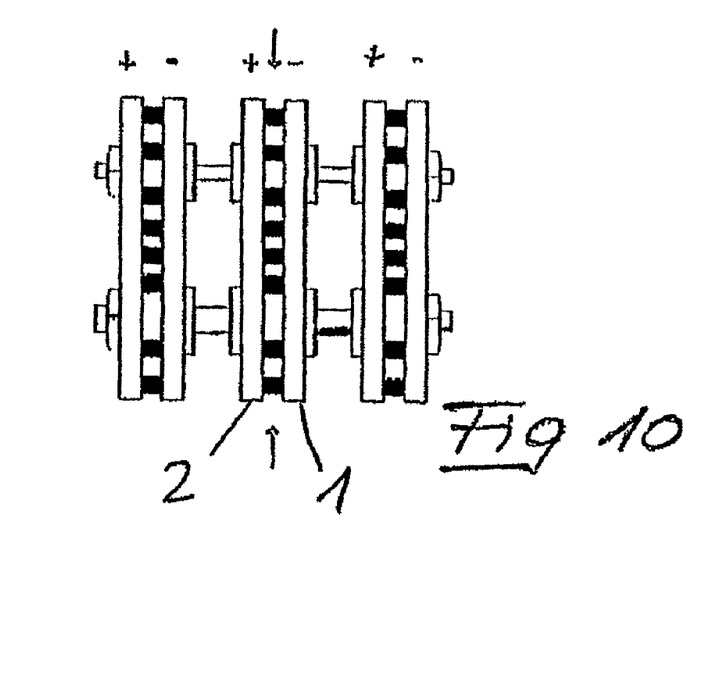
FIG. 10 shows a stack which is formed using the assembly according to FIG. 9.

In the exemplary embodiment illustrated in FIG. 9, the polymeric solid electrolyte 3 is applied, in the form of circular area sections 33, to the surface of the second electrode 2 which faces the first electrode 1. The polymeric electrolyte 3 is thus directly laminated to the electrode 2. The plan view of a multiple electrode assembly in FIG. 10 shows that a flow can pass through the interspace between the electrodes 1, 2 horizontally and vertically since the area sections 33 are at a distance from one another on all sides, thus resulting in through-flow regions in the gaps.

Figure 11:
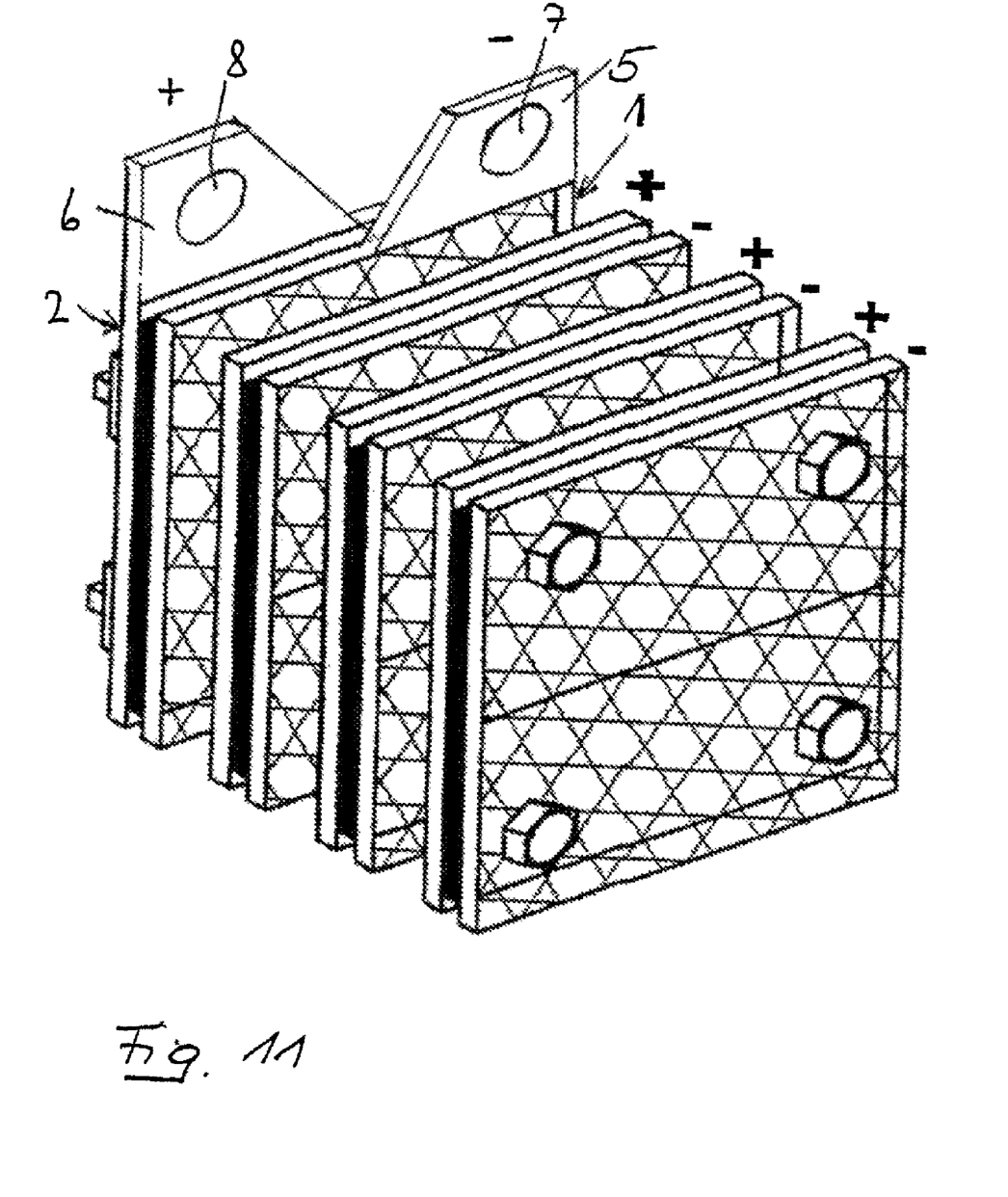
FIG. 11 shows a perspective illustration which is similar to FIG. 3 with contact lugs on the electrodes which are polarized differently.

FIG. 11 shows an enlarged diagrammatic illustration of the contact-connection of the electrodes 1, 2 using the contact lugs 5, 6 and the passage openings 7, 8 situated in the latter. The contact lugs 5, 6 of the respective identically polarized electrodes 1, 2 are aligned with one another (FIG. 11 depicts contact lugs 5, 6 only for the two rear electrodes 1, 2 of the stack). The contact lugs 5 of the first electrodes 1 can be contact-connected to one another by means of a contact bolt (not illustrated), which is inserted through the passage openings 7 which are aligned with one another, and can thus be jointly connected to a pole of the supply voltage. The other electrodes 2 are contact-connected in the same manner using the contact lugs 6 and the passage openings 8 which are situated in the latter and are aligned with one another.

FIG. 12 illustrates the structure of a treatment cell 100, only the anodes 2 of the electrode assemblies, which are contact-connected using their contact lugs 5 which are aligned with one another, being illustrated for the sake of clarity. The cell 100 has a housing 101 having an inlet opening 102 for the water to be purified. In the housing 101, the water to be purified flows into the region of the electrodes 2 from bottom to top and emerges from the region of the electrodes 2 at the side in order to leave the housing 101 in purified form via the outlet openings 103. Ventilation slots 104 are situated in the upper region of the housing 101.

Figure 13:
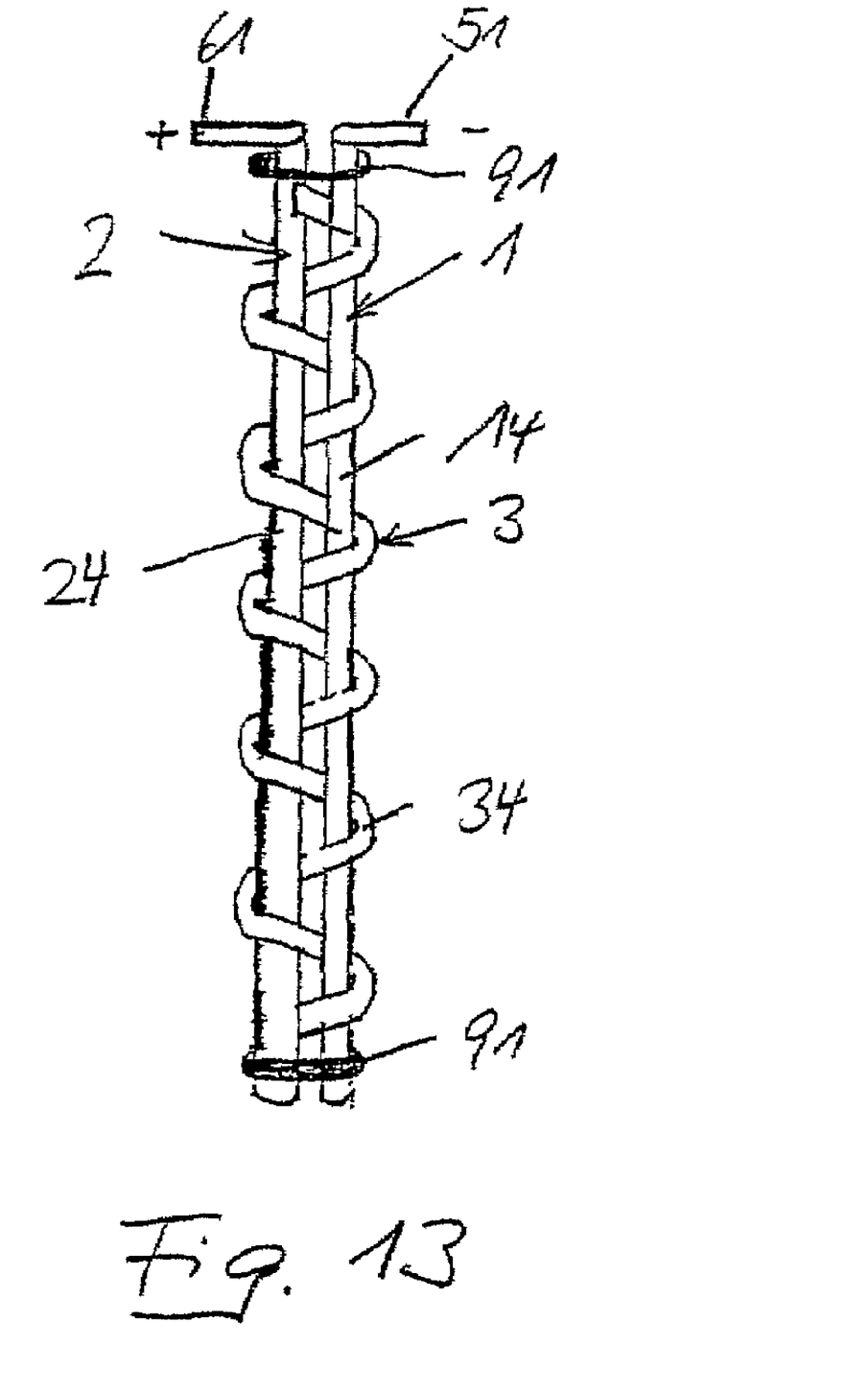
FIG. 13 shows a view of an electrode assembly having two electrodes in the form of rods.

FIG. 13 shows a different arrangement of the electrodes 1, 2 which are designed as electrodes 14, 24 in the form of rods in this exemplary embodiment. The solid electrolyte 3 which, in the form of a long strip 34, form the shape of a "figure of eight" in a meandering fashion is wound around the electrodes 1, 2 with prestress, so that the strip 34 already pulls the electrodes 1, 2 against one another, is used as a spacer between the electrodes 1, 2. The electrodes are pressed against one another and against the sections of the solid electrolyte 3 between them using two loops 91 of an insulating material in the form of a wire which are placed around the electrodes 1, 2 and can be pulled together using twisted ends in order to thus pull the electrodes 1, 2 against one another.

The electrodes 1, 2 are contact-connected at ends using contact pieces 51, 61. Such a design of the electrode assembly is particularly suitable for purifying water in tube systems.

The invention claimed is:

1. An electrode assembly for the electrochemical treatment of liquids with a low conductivity, comprising:
   at least two electrodes;
   an interspace defined by said at least two electrodes through which liquid can flow;
   at least one polymeric solid electrolyte arranged in said interspace between said at least two electrodes;
   a pressure-exerting device generating a contact-pressure force for pressing the electrodes against each other through the polymeric solid electrolyte,
   wherein the pressure exerting device is supported directly on the electrodes so that the polymeric solid electrolyte obtains a contact pressure force from the mechanical stability of the electrodes; and
   wherein the polymeric solid electrolyte is arranged in strips, which are at a distance from one another, in the interspace between the at least two electrodes, so that a flow can pass parallel to the at least two electrodes.

2. The electrode assembly as claimed in claim 1 wherein at least one electrode of said at least two electrodes has a support which is coated with a doped diamond layer.

3. The electrode assembly as claimed in claim 2 wherein the support comprises metal.

4. The electrode assembly as claimed in claim 3 wherein the support is formed from an expanded metal grid.

5. The electrode assembly as claimed in claim 3 wherein the electrodes have passage openings to the polymeric solid electrolyte.

6. The electrode assembly as claimed in claim 2 wherein the electrodes have passage openings to the polymeric solid electrolyte.

7. The electrode assembly as claimed in claim 1 the polymeric solid electrolyte has passage openings.

8. The electrode assembly as claimed in claim 1 wherein the polymeric solid electrolyte is applied to one of the electrodes as a surface layer.

9. The electrode assembly as claimed in claim 1, wherein a stack of a plurality of electrodes and a plurality of polymeric solid electrolytes are arranged between two respective electrodes of said at least two electrodes, said electrodes and electrolytes being jointly pressed against one another by the pressure-exerting device.

10. The electrode assembly as claimed in claim 1 wherein a plurality of individual assemblies which are formed from two respective electrodes and one polymeric solid electrolyte in the interspace between the electrodes are connected to the pressure-exerting device to form a stack.

11. The electrode assembly as claimed in claim 1 wherein the electrodes are flat.

12. The electrode assembly as claimed in claim 1 wherein the pressure-exerting device comprises a plurality of screw connections which are led through the electrodes and are made of insulating material.

13. The electrode assembly as claimed in claim 1 wherein the pressure-exerting device is formed from material which is in the form of a wire, is wrapped around the electrodes and has ends which are twisted together in order to generate pressure.

14. The electrode assembly as claimed in claim 1 wherein the at least two electrodes are in the form of rods, and wherein the polymeric solid electrolyte in the form of a strip alternately wrapping around the electrodes under prestress.

15. An electrode assembly for the electrochemical treatment of liquids with a low conductivity, comprising:
   at least two electrodes;
   an interspace defined by said at least two electrodes through which liquid can flow;
   at least one polymeric solid electrolyte arranged in said interspace between said at least two electrodes; and
   a pressure-exerting device generating a contact-pressure force for pressing the electrodes against each other through the polymeric solid electrolyte,
   wherein the pressure-exerting device supported directly on the electrodes so that the polymeric solid electrolyte obtains a contact pressure force from the mechanical stability of the electrodes, and
   wherein the polymeric solid electrolyte is arranged in the interspace between the electrode in area pieces which are at a distance from one another so as to provide through flow regions within said interspace which are parallel to said electrodes.

16. The electrode assembly as claimed in claim 15 wherein at least one electrode of said at least two electrodes has a support which is coated with a doped diamond layer.

17. The electrode assembly as claimed in claim 16 wherein the support comprises metal.

18. The electrode assembly as claimed in claim 17 wherein the support is formed from an expanded metal grid.

19. The electrode assembly as claimed in claim 17 wherein the electrodes have passage openings to the polymeric solid electrolyte.

20. The electrode assembly as claimed in claim 16 wherein the electrodes have passage openings to the polymeric solid electrolyte.

21. The electrode assembly as claimed in claim 15 the polymeric solid electrolyte has passage openings.

22. The electrode assembly as claimed in claim 15 wherein the polymeric solid electrolyte is applied to one of the electrodes as a surface layer.

23. The electrode assembly as claimed in claim 15, wherein a stack of a plurality of electrodes and a plurality of polymeric solid electrolytes are arranged between two respective electrodes of said at least two electrodes, said electrodes and electrolytes being jointly pressed against one another by the pressure-exerting device.

24. The electrode assembly as claimed in claim 15 wherein a plurality of individual assemblies which are formed from two respective electrodes and one polymeric solid electrolyte in the interspace between the electrodes are connected to the pressure-exerting device to form a stack.

25. The electrode assembly as claimed in claim 15 wherein the electrodes are flat.

26. The electrode assembly as claimed in claim 15 wherein the pressure-exerting device comprises a plurality of screw connections which are led through the electrodes and are made of insulating material.

27. The electrode assembly as claimed in claim 15 wherein the pressure-exerting device is formed from material which is in the form of a wire, is wrapped around the electrodes and has ends which are twisted together in order to generate pressure.

28. The electrode assembly as claimed in claim 15 wherein the at least two electrodes are in the form of rods, and wherein the polymeric solid electrolyte in the form of a strip alternately wrapping around the electrodes under prestress.

29. An electrode assembly for the electrochemical treatment of liquids with a low conductivity, comprising:
   at least two electrodes;
   an interspace defined by said at least two electrodes through which liquid can flow;
   at least one polymeric solid electrolyte arranged in said interspace between said at least two electrodes;
   a pressure-exerting device generating a contact-pressure force for pressing the electrodes against each other through the polymeric solid electrolyte,
   wherein the pressure-exerting device supported directly on the electrodes so that the polymeric solid electrolyte obtains a contact pressure force from the mechanical stability of the electrodes, and
   wherein the pressure-exerting device is formed from material in the form of a wire, is wrapped around the electrodes and has ends which are twisted together in order to generate the pressure.

30. The electrode assembly of claim 29, wherein the two electrodes are in the form of rods, and wherein the polymeric solid electrolyte in the form of a strip alternately wrapping around the electrodes under prestress.

31. The electrode assembly as claimed in claim 29 wherein at least one electrode of said at least two electrodes has a support which is coated with a doped diamond layer.

32. The electrode assembly as claimed in claim 31 wherein the support comprises metal.

33. The electrode assembly as claimed in claim 32 wherein the support is formed from an expanded metal grid.

* * * * *